(12) United States Patent
Zhao et al.

(10) Patent No.: US 11,091,651 B2
(45) Date of Patent: Aug. 17, 2021

(54) ACETOACETYL THERMOSETTING RESIN FOR GEL COAT

(71) Applicant: Polynt Composites USA, Inc., Carpentersville, IL (US)

(72) Inventors: Ming Yang Zhao, Kansas City, MO (US); Chih-Pin Hsu, Parkville, MO (US); Steven L. Voeks, Smithville, MO (US); Richard Landtiser, Parkville, MO (US)

(73) Assignee: Polynt Composites USA, Inc., Carpentersville, IL (US)

( * ) Notice: Subject to any disclaimer, the term of this patent is extended or adjusted under 35 U.S.C. 154(b) by 216 days.

(21) Appl. No.: 15/821,168

(22) Filed: Nov. 22, 2017

(65) Prior Publication Data

US 2018/0094142 A1    Apr. 5, 2018

Related U.S. Application Data

(63) Continuation of application No. 14/800,245, filed on Jul. 15, 2015, now abandoned, which is a continuation of application No. 13/790,608, filed on Mar. 8, 2013.

(60) Provisional application No. 61/608,760, filed on Mar. 9, 2012.

(51) Int. Cl.
| | |
|---|---|
| *C09D 4/00* | (2006.01) |
| *C08K 3/34* | (2006.01) |
| *C08K 3/22* | (2006.01) |
| *C08K 3/36* | (2006.01) |
| *B65D 25/14* | (2006.01) |
| *C09D 4/06* | (2006.01) |

(52) U.S. Cl.
CPC ............... *C09D 4/00* (2013.01); *B65D 25/14* (2013.01); *C08K 3/22* (2013.01); *C08K 3/34* (2013.01); *C08K 3/36* (2013.01); *C09D 4/06* (2013.01); *C08K 2003/2241* (2013.01); *Y10T 428/31909* (2015.04)

(58) Field of Classification Search
CPC ... C08K 3/22; C08K 3/34; C08K 3/36; C08K 2003/2241; B65D 25/25; B65D 25/14; C09D 4/00; C09D 4/06; Y10T 428/31909
See application file for complete search history.

(56) References Cited

U.S. PATENT DOCUMENTS

| | | | |
|---|---|---|---|
| 4,408,018 A | 10/1983 | Bartman et al. | |
| 4,449,918 A | 5/1984 | Spahr | |
| 4,497,918 A * | 2/1985 | Wason | C08K 3/36 523/207 |
| 4,767,846 A | 8/1988 | Stepto et al. | |
| 4,772,680 A | 9/1988 | Noomen et al. | |
| 4,822,518 A | 4/1989 | Goel et al. | |
| 5,017,649 A * | 5/1991 | Clemens | C08F 8/28 525/59 |
| 5,874,503 A | 2/1999 | Scheibelhoffer et al. | |
| 6,204,343 B1 | 3/2001 | Barucha et al. | |
| 6,617,395 B1 | 9/2003 | Zhao et al. | |
| 6,646,153 B1 | 11/2003 | Huybrechts | |
| 6,794,049 B2 | 9/2004 | Kuo et al. | |
| 7,307,106 B2 | 12/2007 | Fansler et al. | |
| 7,329,713 B2 | 2/2008 | Schorr | |
| 7,396,429 B2 * | 7/2008 | Beckley | C08G 61/12 156/275.7 |
| 7,431,789 B2 | 10/2008 | Mack et al. | |
| 7,473,719 B2 | 1/2009 | Plaut et al. | |
| 7,473,734 B2 | 1/2009 | Beckley et al. | |
| 7,723,431 B1 | 5/2010 | Robertson | |
| 7,799,943 B2 * | 9/2010 | Shah | C08F 220/06 560/181 |
| 2001/0051695 A1 * | 12/2001 | Crump | C08F 8/14 526/75 |
| 2004/0186310 A1 | 9/2004 | Kim et al. | |
| 2005/0245636 A1 | 11/2005 | Fechter et al. | |
| 2007/0173602 A1 | 7/2007 | Brinkman et al. | |
| 2009/0076218 A1 | 3/2009 | Zhao et al. | |

FOREIGN PATENT DOCUMENTS

| | | | |
|---|---|---|---|
| CN | 1757655 | 4/2006 | |
| EP | 0160824 | 3/1985 | |
| EP | 0227454 | 7/1987 | |
| EP | 0227454 A2 * | 7/1987 | ............... C08F 8/14 |
| EP | 0570213 | 11/1993 | |
| EP | 0580328 | 1/1994 | |
| EP | 0854153 | 7/1998 | |
| EP | 0982327 | 3/2000 | |
| EP | 1866363 | 9/2010 | |
| JP | 2004169024 | 6/2004 | |
| JP | 2006028418 | 2/2006 | |

(Continued)

OTHER PUBLICATIONS

Viscosity Conversion Char (Sep. 2004) (Year: 2004).*
Carraher's Polymer Chemistry Eight Edition, Oct. 2010, p. 105.
CCP POLYCOR® STYPOL®; DS-44F POLYCOR® Isophthalic Gel Coat Tinting Base 944X064 Information Sheets; Oct. 2003, 4 pgs.; Cook Composites and Polymers; www. ccponline.com.
International Preliminary Report on Patentability and Written Opinion for PCT/EP2013/054774 dated Sep. 9, 2014 (23 pp.).
Machine translation of JP2004-169024.
Machine translation of JP2006-28418.
Marsh, Stacey J.; "POLY 367—Acetoacetate Chemistry for High-Solid Coatings Resins"; retrieved from the internet Feb. 10, 2012; http://oasys2.confex.com/acs/225nm/techprogram/P625237.HTM.
Mather, Brian D., et al.; Macromol. Chem. Phys. 2006, 207, pp. 1324-1333.

(Continued)

*Primary Examiner* — Christopher M Rodd
(74) *Attorney, Agent, or Firm* — Neal, Gerber & Eisenberg LLP

(57) ABSTRACT

Zero VOC thermosetting gel coat and laminating resin compositions, and composites and articles, are produced using a multifunctional Michael acceptor, a multifunctional Michael donor and a base catalyst. The obtained low viscosity resin is useful for producing zero VOC gel coats and laminates having excellent curability at ambient temperatures.

19 Claims, No Drawings

(56) References Cited

FOREIGN PATENT DOCUMENTS

WO     WO1994021738     9/1994
WO     WO2008145489     12/2008

OTHER PUBLICATIONS

Mather, Brian D., et al.; Prog. Polym. Sci. 31 (2006) pp. 487-531.
Office Action for Eurasian Patent Application No. 201491664 dated Sep. 18, 2017.
Ozturk, Gozde, et al.; Journal of Polymer Science: Part A: Polymer Chemistry, vol. 47, pp. 5437-5447 (2009); published at www.interscience.wiley.com.
POLYCOR® 949 Series Sanding Gel Coats Technical Data Sheet; copyright 1996-2003; 6 pgs.; CCP Composites US; www.ccpcompositesus.com.
POLYCOR® 992 Series Sanitary Gel Coat Technical Data Sheet; copyright 2004-2006; 6 pgs. CCP Composites US; www.ccpcompositesus.com.
Viscosity Conversion Chart (Sep. 2004).
Williams, Sharlene R., et al.; Progress in Reaction Kinetics and Mechanism, vol. 32, pp. 165-194, 2007.

\* cited by examiner

ACETOACETYL THERMOSETTING RESIN FOR GEL COAT

CROSS-REFERENCE TO RELATED APPLICATIONS

This application is a continuation of U.S. patent application Ser. No. 14/800,245, filed Jul. 15, 2015, which is a continuation of U.S. patent application Ser. No. 13/790,608, filed Mar. 8, 2013, which claims the benefit of U.S. Provisional Application No. 61/608,760, filed Mar. 9, 2012, all of which applications are incorporated herein by reference in their entireties for all purposes.

FIELD OF THE INVENTION

Embodiments of the invention relate generally to the field of gel coats and laminating resins, and more particularly to methods of making low viscosity, low to zero VOC acetoacetyl thermosetting resins for gel coat and laminating resin compositions utilizing a Michael-type addition crosslinking reaction.

BACKGROUND OF THE INVENTION

The application of gel coats are widely used in numerous applications as the external surface layer of composite molded articles. Gel coats are typically found on composite articles that are exposed to the environment requiring moisture resistance, resistance to cracking and similar properties, or articles that require a strong, flexible, abrasion and impact resistant surface and/or a smooth glossy finish. Examples of such articles include boat hulls, bath tub enclosures, pools, spas, and body panels on cars and trucks, among others.

Such gel coated articles are typically formed by spraying a gel coat composition from a high pressure spray gun onto the inside surface of an open mold, applying the materials and a laminating resin for the composite article onto the gel coat, curing the gel coat and then removing the cured gel coated article from the mold. Gel coated articles can also be fabricated by applying the composite materials into a multi-part mold, injecting or applying the gel coat composition, closing the mold, curing the gel coat and then removing the cured gel coated article from the mold.

Gel coats for composite articles are typically formulated from a thermosetting base resin system such as unsaturated polyester, acrylate and urethane type resins with incorporated fillers, pigments and other additives. The gel coat should exhibit low viscosity at high shear to allow for ease of application to the mold, but also resist sagging or running after it is applied. Another important property of gel coats is surface tackiness and cure time. A gel coat desirably produces a gel time of 10 to 20 minutes. Many low or zero VOC gel coats remain tacky after several hours of curing.

Typically, the gel coat resin is mixed with reactive, polymerizable monomers such as styrene or methyl methacrylate (MMA), which are also used to, reduce resin system viscosity in order to apply the gel coat by spraying. Conventional gel coat compositions contain 35 to 45 wt % of reactive monomers and other volatile organic compounds (VOCs). The presence of high amounts of styrene and other VOCs results the emission of styrene vapors and other hazardous air pollutants (HAP), which are closely regulated by government regulations. Consequently, the composites industry is very interested in providing gel coats that emit low to zero VOCs.

However, there are difficulties in attaining gel coats having low to zero VOCs and acceptable application and performance properties. Several approaches have been described for addressing these requirements. One way to reduce VOCs is to reduce the molecular weight of the resin, which leads to a lower viscosity and lower styrene need. However, in application, a gel coat made with a lower molecular weight resin tends to remain tacky for long periods of time. The use of higher molecular weight resins results in higher viscosities that hamper spray applications of the gel coat composition, which generally require a viscosity in the range of 50 to 1200 cps under high shear. In order to achieve target viscosity, monomers with high boiling point are used to replace monomers which contribute to VOC. These high boiling point monomers typically have higher viscosity and lower reactivity with a resin solid. As a result, a higher amount of high-boiling point monomers is required to replace the standard monomers in gel coat formulations and the resulting product is very slow to cure.

There remains a significant need for a resin material that provides good rheology properties for in-mold coating applications, fast curing and a better cured gel coat product having low to zero VOCs and a high degree of crosslinking.

SUMMARY OF THE INVENTION

The invention provides methods and gel coat and laminating resin compositions that overcome the above-described deficiencies and provide styrene free and zero VOC gel coats having a desirable viscosity for application, a fast gel time and set-up, and produce cured gel coats and laminating resins having a high degree of crosslinking with excellent performance properties.

In embodiments, the invention provides methods for making styrene free and zero VOC gel coats. In one embodiment, the method comprises:

reacting a polyhydroxy polyol having at least two, preferably three, hydroxyl groups per molecule with a $C_1$-$C_5$ alkyl acetoacetate in a transesterification process to form a crosslinkable, multifunctional acetoacetylated polyhydroxy polyol having at least two acetoacetyl functional groups per oligomer; and combining the acetoacetylated polyhydroxy polyol with one or more multifunctional acrylate monomers or oligomers, at least one additive component, and a base catalyst, to form a crosslinkable, thermosetting gel coat composition having a viscosity of about 50 to 1200 cps under high shear.

In use, the gel coat composition can be used in making a gel coated article. In embodiments, the gel coated article is fabricated by:

applying the thermosetting gel coat composition as an in-mold coating to a surface of a mold;

allowing the gel coat composition to cure at ambient temperature to form a partially crosslinked, tacky to tacky-free gel coat;

applying a material to be molded onto the partially crosslinked gel coat;

applying a crosslinkable laminating resin onto said material, the laminating resin comprising an acetoacetylated polyhydroxy polyol having at least two, preferably three, acetoacetyl functional groups per oligomer, one or more multifunctional acrylate monomers or oligomers and a base catalyst; and allowing the laminating resin and the gel coat to cure at ambient temperature to a solid, crosslinked, thermoset resin being styrene free with zero VOCs.

The resulting gel coated article comprises the cured thermoset gel coat bonded onto the surface of the article. In embodiments, the cured thermoset gel coat and laminating resin comprise crosslinked acetoacetate functionalized acrylate oligomers, and are preferably at least 50%, preferably 70 to 100%, crosslinked.

The invention also provides methods for making a laminating resin composition. In embodiments, the method comprises:

reacting a polyhydroxy polyol having at least two, preferably three, hydroxyl groups per molecule with a $C_1$-$C_5$ alkyl acetoacetate in a transesterification process to form a crosslinkable, multifunctional acetoacetylated polyhydroxy polyol having at least two, preferably three, acetoacetyl functional groups per oligomer; and combining the acetoacetylated polyhydroxy polyol with one or more multifunctional acrylate monomers or oligomers and a base catalyst to form a crosslinkable, thermosetting laminating resin composition having a Brookfield viscosity of about 50 to 1200 cps.

The laminating resin composition can be cured at ambient temperature to form a solid, crosslinked, thermoset resin comprising crosslinked acetoacetate-functionalized acrylate oligomers, with the laminating resin being styrene free with zero VOCs and preferably at least 50%, preferably 70 to 100%, crosslinked.

The invention further provides a crosslinkable, styrene free and zero VOC gel coat composition. In an embodiment, the crosslinkable gel coat composition comprises an acetoacetylated polyhydroxy polyol, one or more multifunctional acrylate monomers or oligomers, a base catalyst, and at least one additive component selected from the group consisting of fillers, pigments and thixotropic agents, and has a viscosity of about 50 to 1200 cps under high shear, and is curable under ambient conditions to form a solid thermoset gel coat comprising crosslinked acetoacetate-functionalized acrylate oligomers, the gel coat being styrene free with zero VOCs and preferably at least 50%, preferably 70 to 100%, crosslinked.

The invention also provides a crosslinkable, styrene free and zero VOC laminating resin composition. In an embodiment, the crosslinkable laminating resin composition comprises an acetoacetylated polyhydroxy polyol, one or more multifunctional acrylate monomers or oligomers, and a base catalyst, and has a Brookfield viscosity of about 50 to 1200 cps, and is curable under ambient conditions to form a laminating resin comprising crosslinked acetoacetate-functionalized acrylate oligomers, the laminating resin being styrene free with zero VOCs and preferably at least 50%, preferably 70 to 100%, crosslinked.

Also provided is a system for forming a gel coat composition. In an embodiment, the system is composed of separate containers packaged together, including:

a container of a curable, thermosetting gel coat composition comprising a crosslinkable, multifunctional acetoacetylated polyhydroxy polyol having at least two, preferably three, acetoacetyl functional groups per oligomer, one or more multifunctional acrylate monomers or oligomers and at least one additive component selected from the group consisting of fillers, pigments and thixotropic agents for a gel coat;

a container of a base catalyst selected from the group consisting of 1,8-diazabicyclo-[5.4.0]undec-7-ene (DBU), 1,5-diazabicyclo[4,3,0]non-5-ene (DBN), 1,5,7-triazabicyclo[4,4,0]dec-5-ene (TBD), 7-methyl-1,5,7-triazabicyclo[4,4,0]dec-5-ene (MTBD), tetramethylguanidine (TMG) and 1,4-diazabicyclo[2.2.2]octane (DABCO), and N'-butyl-N'',N''-dicyclohexylguanidine, and mixtures thereof; and directions for combining the contents of the containers to form a thermosetting gel coat composition, which, in embodiments, has a viscosity of about 50 to 1200 cps under high shear, is curable at ambient temperature to form a crosslinked, styrene free and zero VOC thermoset gel coat comprising crosslinked acetoacetate-functionalized acrylate oligomers, which is preferably at least 50%, preferably 70 to 100%, crosslinked.

A system is also provided for forming a laminating resin composition. In an embodiment, the system is composed of separate containers packaged together, including:

a container of a curable, thermosetting laminating resin composition comprising a crosslinkable, multifunctional acetoacetylated polyhydroxy polyol having at least two, preferably three, acetoacetyl functional groups per oligomer and one or more multifunctional acrylate monomers or oligomers;

a container of a base catalyst selected from the group consisting of 1,8-diazabicyclo-[5.4.0]undec-7-ene (DBU), 1,5-diazabicyclo[4,3,0]non-5-ene (DBN), 1,5,7-triazabicyclo[4,4,0]dec-5-ene (TBD), 7-methyl-1,5,7-triazabicyclo[4,4,0]dec-5-ene (MTBD), tetramethylguanidine (TMG) and 1,4-diazabicyclo[2.2.2]octane (DABCO), and N'-butyl-N'',N''-dicyclohexylguanidine, and mixtures thereof; and directions for combining the contents of the containers to form a thermosetting laminating resin composition, which, in embodiments, has a Brookfield viscosity of about 50 to 1200 cps, is curable at ambient temperature to form a crosslinked, styrene free and zero VOC thermoset laminating resin comprising crosslinked acetoacetate-functionalized acrylate oligomers, which is preferably at least 50%, preferably 70 to 100%, crosslinked.

DETAILED DESCRIPTION OF PREFERRED EMBODIMENTS

Embodiments of the invention relate to methods of making zero VOC, crosslinkable, thermosetting resins from acetoacetate-functionalized polyhydroxy polyols and multifunctional acrylate monomers or oligomers for producing laminating resins and gel coat compositions, which are crosslinked using a Michael-type addition reaction with a base catalyst to obtain laminates and gel coated articles. The thermosetting resins have excellent curability at ambient or room temperatures. In embodiments, the process results in an at least 50%, preferably 70 to 100%, crosslinked thermoset polymer network, that is VOC and styrene free with excellent mechanical properties.

The thermosetting resins are crosslinked without styrene or free-radicals, using a Michael-type addition reaction with a base catalyst at ambient temperatures to incorporate acrylate functionality into a multifunctional acetoacetylated polyhydroxy polyol to produce a thermoset, crosslinked polymer network in which the acetoacetate-functionalized acrylate oligomers are up to 100% crosslinked.

Unless otherwise specified herein, the term "viscosity" refers to the viscosity of a polymer in monomer at 25° C. (77° C.) measured in centipoise (cps) using a Brookfield RV model viscometer. The viscosity under high shear is measured by a cone and plate (CAP) viscometer at a shear rate of 10,000 l/s. The term "NVM" refers to non-volatile material dispersed in a volatile substance (e.g., monomer) as measured according to ASTM D1259.

Unless stated otherwise, all percent and ratios of amounts are by weight.

Acetoacetate-Functionalized Polyhydroxy Polyol

The acetoacetate-functionalized polyhydroxy polyol has at least two, and in some embodiments preferably at least three acetoacetyl functional groups per oligomer. The functionalized polyol is then blended with a multifunctional acrylate to form a thermosetting, crosslinkable resin.

In embodiments of the invention, multifunctional acetoacetylated polyols can be prepared by reaction of a polyhydroxy polyol (also termed "polyhydric alcohol" or "polymeric polyol"), in a transesterification reaction with an alkyl acetoacetate compound, preferably a $C_1$-$C_5$ alkyl acetoacetate.

Suitable polyhydroxy polyol compounds have an average of at least two, preferably at least three (i.e., tripolyol), hydroxyl groups per molecule. Non-limiting examples of polyhydroxy polyols include methyl propanediol (MPD), trimethylolpropane (TMP), trimethylpentanediol, di-trimethylolpropane (di-IMP), butyl ethyl propanediol (BEPD), neopentyl glycol (NEO), pentaerythritol (Penta), di-pentaerythritol (di-Penta), tris-2-hydroxyethyl isocyanurate (THEIC), 4,4'-isopropylidenedicyclohexanol (hydrogenated bisphenol-A (HBPA), hydroxyl-functionalized acrylic polymers, among others, and mixtures of two or more of such compounds. In embodiments, the polyhydroxy polyol has a hydroxyl number of from 30 up to 1850 mg/KOH/g, and a number average molecular weight of 90 up to 5000 g/mol.

Non-limiting examples of suitable $C_1$-$C_5$ alkyl acetoacetates (esters of acetoacetic acid) include methyl acetoacetate (MAA), ethyl acetoacetate (FAA), n-propyl acetoacetate, isopropyl acetoacetate, n-butyl acetoacetate, tert-butyl acetoacetate (TBAA), pentyl (amyl) acetoacetate, n-pentyl acetoacetate, isopentyl acetoacetate, tert-pentyl acetoacetate, acetoacetate-functionalized acrylic polymer based on acetoacetoxyetheyl methacrylate, including copolymers with different acrylic monomers, among others, and mixtures of two or more of such compounds.

Procedures for preparing crosslinkable, functionalized acetoacetylated polyols by reaction of a polyol with an alkyl acetoacetate compound in a transesterification reaction are generally known in the art. In embodiments, the polyol and alkyl acetoacetate compounds are reacted in a transesterification reaction at a temperature of 90 to 200° C. for 3 to 15 hours to form the functionalized polyol. In some embodiments, 10 to 90 wt % polyol is combined with 90 to 10 wt % alkyl acetoacetate, based on the total weight of the mixture.

In embodiments, at least 70% of the hydroxyl groups of the polyhydroxy polyol are converted to acetoacetyl groups, and more preferably 80 to 100% of the hydroxyl groups are converted. In embodiments, the acetoacetylated polyols have an acetoacetyl content within a range of from 5 to 80 weight %, a hydroxyl number within a range of 0 to 60 mg KOH/g, and acid value of 0 to 5 mg KOH/g, and a number average molecular weight (Mn) within a range of 250 to 6000 g mole$^{-1}$, preferably 300 to 5000 g mole$^{-1}$.

In embodiments, the acetoacetate-functionalized polyol can be prepared in a multi-stage reaction in which the polyhydroxy polyol is initially reacted by the condensation reaction with a dicarboxylic acid/anhydride or polyacid with a glycol or polyol, examples of suitable carboxylic acids include isophthalic acid, orthophthalic acid, terephtalic acid, succinic acid, adipic acid, maleic acid, fumaric acid, azelaic acid, 1,4-cyclohexane dicarboxylic acid, itaconic acid, sebacic acid, tetrahydrophthalic anhydride, trimelitic anhydride, among others, and mixtures of two or more of such compounds. In embodiments, the dicarboxylic acid and polyhydroxy polyol are reacted in a first stage reaction at 150 to 225° C. for about 5 to 20 hours, until an acid value of less than 20 mg KOH/g, preferably less than 10 mg KOH/g, is reached. In embodiments, the molar ratio of acid functional groups to hydroxyl functional groups is 0.2 to 0.8. In a second stage reaction, an alkyl acetoacetate compound is mixed with the resulting polyester polyol and the reaction proceeds for about 3 to 15 hours to form the acetoacetate-functionalized polyol. In embodiments, 25 to 90 wt % of the polyester polyol is combined with 75 to 10 wt % alkyl acetoacetate, based on the total weight of the mixture.

In another embodiment, the acetoacetate-functional zed polyhydroxy polyol can be prepared in a multi-step reaction, in which a $C_2$ to $C_{13}$ alkanolamine is reacted with a cyclic, 5-ring hydroxy-functional carbonate in a first step to form a polyurethane polyol intermediate. In embodiments, the molar ratio of alkanolamine to the 5-ring carbonate is at or about close to 1 with slightly excess of carbonate. Non-limiting examples of suitable alkanolamines (also referred to as "amino alcohols") include monoethanolamine (MEA), propanolamine, isopropanol amine, and 2-aminobutanol, among others, and mixtures of two or more of such compounds. Non-limiting examples of suitable 5-ring carbonates include glycerine carbonate (GC), ethylene carbonate, propylene carbonate and butylene carbonate, among others, and mixtures of two or more of such compounds.

In embodiments, the alkanolamine and 5-ring hydroxy-functional carbonate are reacted at 20 to 75° C. for about 5 to 8 hours. In a second stage reaction, the resulting polyurethane polyol is mixed with an alkyl acetoacetate compound and reacted for about 3 to 15 hours to form the functionalized acetoacetylated polyol.

In another embodiment, the acetoacetate-functionalized polyhydroxy polyol can be prepared in a multi-step reaction, in which the polyol is formed through free radical copolymerization of vinyl monomers and at least one vinyl monomer containing hydroxyl groups. The resulting polyol contains at least two, preferably three, hydroxyl functional groups in each polymer. Non-limiting examples of suitable vinyl monomers containing hydroxyl groups include hydroxyethyl acrylate, hydroxyethyl methacrylate, hydroxypropyl acrylate, and hydroxylpropyl methacrylate, among others, and mixtures of two or more of such compounds. Non-limiting examples of suitable vinyl monomers include aromatic compounds such as styrene, alpha-methyl styrene, vinyl toluene, vinyl phenol and the like, and unsaturated esters such as acrylic and methacrylic ester, vinyl laurate and the like, among others, and mixtures thereof. In a second stage reaction, the resulting polyol is mixed with an alkyl acetoacetate compound and reacted for about 3 to 15 hours to form the functionalized acetoacetylated polyol.

In another embodiment, the acetoacetate functionalized polyhydroxy polyol is made directly by free radical copolymerization of vinyl monomers and at least one vinyl monomer contains acetoacetate functional group. The resulting copolymer contains at least two, preferably three, acetoacetate functional groups in each polymer. Non-limiting examples of suitable vinyl monomers containing acetoacetate functional group include acetoacetoxyethyl methacrylate (AAEM), acetoacetoxyethyl acrylate (AAEA), acetoacetoxypropyl methacrylate, acetoacetoxypropyl acrylate, acetoacetoxybutyl methacrylate, and acetoacetoxybutyl acrylate, among others, and mixtures thereof.

The resulting acetoacetylate-functionalized polymer is a thermosetting, crosslinkable resin, having at least two, and in some embodiments at least three, acetoacetyl functional groups per polymer, which can be used, for example, in the formulation of laminating resins and gel coat compositions.

Gel Coats

Gel coats (also termed "gel coat compositions") are compositions in a curable (e.g., pre-cured) state, composed of a blend of one or more of the acetoacetate-functionalized polyhydroxy polyol resin material with one or more multifunctional acrylate monomers and/or oligomers and one or more additives. Gel coats are typically free of fibers. In embodiments, the acetoacetate-functionalized polyol is combined with the one or more multifunctional acrylate monomers or oligomers. Preferably, the molar ratio of the acetoacetate functional group to acrylate functional group is 0.2 to 5.0, and preferably, a molar ratio of 0.3 to 3.0. In embodiments, 15 to 70 wt % of the acetoacetate-functionalized polyol is combined with 15 to 70 wt % of one or more multifunctional acrylate monomers or oligomers and 2 to 40 wt-% additives, based on the total weight of the mixture.

The gel coat composition can be prepared by high speed dispersion of the filler, pigment and other additives into the resin mixture. The viscosity of the gel coat composition (without catalyst) can range from 8,000 to 25,000 cps, and preferably 10,000 to 20,000 cps when measured by Brookfield viscometer at 4 rpm.

Multifunctional acrylate monomers. Non-limiting examples of suitable multifunctional acrylate monomers include trimethylolpropane triacrylate (TMPTA), di-trimethylolpropane tetraacrylate, tris (2-hydroxy ethyl) isocyanurate triacrylate, ethoxylated trimethylolpropane triacrylate, polyethylene glycol diacrylate, neopentyl glycol diacrylate, pentaerythritol tetraacrylate, 1,2-ethylene glycol diacrylate, 1,6-hexanediol diacrylate, 1,12-dodecanol diacrylate, hexanediol diacrylate, tripropylene glycol diacrylate, dipropylene glycol diacrylate, amine modified polyether acrylates, glycerol propoxylate triacrylate, dipentaerythritol pentaacrylate, dipentaerythritol hexaacrylate, ethoxylated pentaerythritol tetraacrylate, and the like, as well as mixtures and combinations thereof.

Additives. The gel coat composition includes one or more additive components, for example, one or more fillers, pigments, and/or other additives such thixotropic agents, promoters, stabilizers, extenders, wetting agent, leveling agents, air release agents, as practiced in the art to adjust and enhance the molding properties (e.g., color effect, sprayability, sag resistance, mechanical property consistency, etc.). Gel coats are typically free of fibers.

Examples of fillers for gel coats include inorganic (mineral) fillers, such as clay, magnesium oxide, magnesium hydroxide, aluminum trihydrate (ATE), calcium carbonate, calcium silicate, mica, aluminum hydroxide, barium sulfate, talc, etc., and organic fillers. The amount of filler in the gel coat composition can generally range from 5 up to 30 wt %, based on the total weight of the gel coat composition. Suitable pigments include inorganic pigments, such as titanium dioxide. Thixotropic agents include silica compounds such as fumed silica and precipitated silica, and inorganic clays such as bentonite clay, which, if included, can be present in an amount ranging from 0.3 up to 6 wt %, based on the total weight of the gel coat composition.

Laminating Resin

In embodiments, the acetoacetate-functionalized polyhydroxy polyol resin material can be combined with one or more multifunctional acrylate monomers/oligomers (as described above) to form a curable laminating resin composition. In embodiments, the laminating resin composition is composed of 10 to 90 wt % of the acetoacetate-functionalized polyol combined with 90 to 10 wt % of multifunctional acrylate monomers/oligomers, based on the total weight of the mixture. Preferably, the ratio of the functionalized polyol to multifunctional acrylate monomer/oligomer is 0.2 to 8.5, and more preferably a ratio of 0.25 to 8.0 (w/w). The viscosity of the laminating resin composition is preferably about 50 to 1200 cps.

In use, the laminating resin composition is combined with a base catalyst, and can be utilized in many applications such as for coatings and in reinforced composite products by various open and closed molding processes such as spray-up, hand lay-up, resin transfer molding and wet molding.

Applications

In use, the gel coat composition is combined with a base catalyst and applied as an in-mold coating, typically by manual application or using a gel coat spray technique, onto the surface of a mold that is in the shape and form of the desired article (e.g., bathtub, car or aircraft part, boat hull, swimming pool, etc.). The gel coat is allowed to partially cure such that it is tacky to tacky-free.

The amount of base catalyst included in the gel coat composition is typically 0.2 to 2.5% by weight, based on the total weight of the composition. For optimal processibility, gel time and cure time, the viscosity of the gel coat (with catalyst) can range from 8,000 to 25,000 cps, and preferably 10,000 to 20,000 cps measured by Brookfield viscometer at 4 rpm. Preferably, the gel time of the gel coat is 5 to 30 minutes at ambient temperature. The term "gel time" refers to the time from catalyzation of the gel coat (or laminating resin) to cessation of flow.

Crosslinking of the laminating resin and gel coat occurs by a base-catalyzed Michael-type addition reaction of the acetoacetate-functionalized polyhydroxy polyol and multifunctional acrylate monomers or oligomers at ambient temperatures (about 20 to 25° C.), without heat or UV radiation. The base catalysts are nitrogen containing compounds, which can be represented by the general formula $R^xR^yR^zN$, where $R^x$, $R^y$, and $R^z$ each individually may represent hydrogen, or a $C_1$-$C_{20}$ alkyl, aryl, alkylaryl or arylalkyl group, that each optionally may contain one or more heteroatoms (e.g. oxygen, phosphor, nitrogen or sulfur atoms) and/or substituents. The group may be linear or branched; they also may contain one or more unsaturations or substituents. This general formula $R^xR^yR^zN$ also represents nitrogen compounds, wherein the nitrogen atom shown in the formula is part of a cyclic system formed by two of the groups $R^x$, $R^y$, and $R^z$, or is present in the form of an imine group or as a phosphazene. Non-limiting examples of suitable base catalysts include 1,8-diazabicyclo-[5.4.0]undec-7-ene (DBU), 1,5-diazabicyclo[4,3,0]non-5-ene (DBN), 1,5,7-triazabicyclo[4,4,0]dec-5-ene (TBD), 7-methyl-1,5,7-triazabicyclo[4,4,0]dec-5-ene (MTBD), tetramethylguanidine (TMG) and 1,4-diazabicyclo[2.2.2]octane (DARCO), and N-butyl-N",N"-dicyclohexylguanidine, and the like. In embodiments, the base catalyst can be combined with an organic solvent such as methanol, ethanol, propanol, n-butyl alcohol, acetone, methyl ethyl ketone, among others, and mixtures thereof. In preferred embodiments, the base catalyst is used neat (absence of a solvent).

The article can be a fully or partially cured polymer resin or composite of reinforcing material in a polymer resin matrix. In embodiments, a reinforcing material for forming the article is laid into the open mold onto the partially cured gel coat material. Non-limiting examples of reinforcing materials include glass fiber, polyethylene fiber, carbon fiber, metal fiber, ceramic fiber, or other material used in the composite plastics industry. In embodiments, dry fibers (e.g., glass fibers, glass fiber matt, etc.) are laid onto the partially cured gel coat within the open mold.

The reinforcing material is then wet out by applying a laminating resin in a curable (i.e., pre-cured) state that has been combined with a base catalyst. In embodiments, the laminating resin is composed of 10 to 90 wt % of the acetoacetate-functionalized polyol, 90 to 10 wt % of multifunctional acrylate monomers or oligomers, and 0.2 to 2.5 wt % base catalyst, based on the total weight of the mixture.

The laminating resin is allowed to cure to form a hardened fiber-reinforced resin composite in the desired shape within the mold. The gel coat becomes an integral part of the finished laminate article by forming a covalent interfacial bond with the laminating resin that is used. The gel coat provides a primary bond at the interface with the composite article, unlike the application of a resin coating onto the formed article.

Curing of the laminating resin can be conducted at ambient temperature for about 4 to 40 hours. The gel coated, composite article can then be removed from the mold for use. In some embodiments, the laminate can undergo a post-cure, for example, by heating the mold to an elevated temperature (i.e., to 65° C.) to further increase the degree of cure.

The gel coats of the invention provide a durable and high weather- and wear-resistant coating with good hydrolytic stability, and/or an aesthetic finished surface to the article being produced to improve surface appearance. The gel coats also provide a resilient, light-stable surface covering and, in embodiments, are sufficiently pigmented to yield a desired color. The base catalyzed Michael addition of acetoacetylated resins to acrylate acceptors produces crosslinked networks with low to no volatile organic compounds (VOCs). In embodiments, the cured gel coat and/or laminating resin is at least 50% crosslinked, and preferably 70 to 100% crosslinked. Such crosslinking can be assessed, for example, by measuring the residual reaction exotherm by differential scanning calorimetry (DSC).

The invention will be further described by reference to the following detailed example. This example is not meant to limit the scope of the invention that has been set forth in the foregoing description. Variation within the concepts of the invention is apparent to those skilled in the art. The disclosures of the cited references throughout the application are incorporated by reference herein.

EXAMPLES

The following examples are illustrations of the present invention. They are not to be taken as limiting the scope of the claimed invention. Unless stated otherwise, all percent and ratios of amounts are by weight.

Materials and Abbreviations

The following materials were used in the Examples below.

| Ingredient | |
|---|---|
| SR355 | Di-trimethylolpropane tetraacrylate (Sartomer Co.) |
| SR368 | Tris (2-hydroxy ethyl) isocyanurate triacrylate (Sartomer Co.) |
| SR454 | Ethoxylated trimethylolpropane triacrylate (Sartomer Co.) |
| TMPTA | Trimethylolpropane triacrylate |

-continued

| Ingredient | |
|---|---|
| DBU | 1,8-Diazabicyclo-[5.4.0]undec-7-ene |
| DABCO | 1,4-Diazabicyclo[2.2.2]octane |
| TMG | Tetramethylguanidine |

Example 1: Preparation of TMP Tris-Acetoacetate

A 3 liter, 4-neck round-bottom flask fitted with mechanical stirrer, pressure equalizing addition funnel (nitrogen inlet), thermocouple connected to a controller and heating mantle, was charged with 604 g (4.50 mol) trimethylolpropane (TMP), 850 g toluene and 303 g (1.92 mol) tort-butyl acetoacetate. The mixture was heated to about 110° C. Additional tert-butyl acetoacetate, 1881 g (11.89 mol), was gradually added into flask through additional funnel over about 5 hours. After all tert.-butyl acetoacetate was added, the mixture temperature was increased gradually to 135° C. and keep at this temperature for 2 hours. A vacuum (26" Hg) was applied to remove unreacted liquid and a slight yellow liquid product of 1713 g was obtained.

The reaction is illustrated in Scheme 1 below.

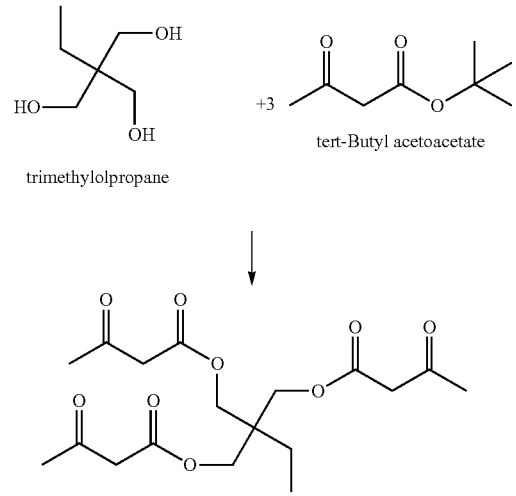

Scheme 1

Example 2: Preparation of THEIC Tris-Acetoacetate

A 2 liter, 4-neck round-bottom flask fitted with mechanical stirrer, pressure equalizing addition funnel (nitrogen inlet), thermocouple connected to a controller and heating mantle, was charged with 628 g (2.40 mol) tris (hydroxyl ethyl) isocyanurate (THEIC) and 1140 g (7.20 mol) tert-butyl acetoacetate. The mixture was heated gradually to about 150° C. in 5 hours and keep at this temperature for another 2 hours. A vacuum (26" Hg) was applied to remove unreacted liquid and a yellow liquid product of 1214 g was obtained.

The reaction is illustrated in Scheme 2 below.

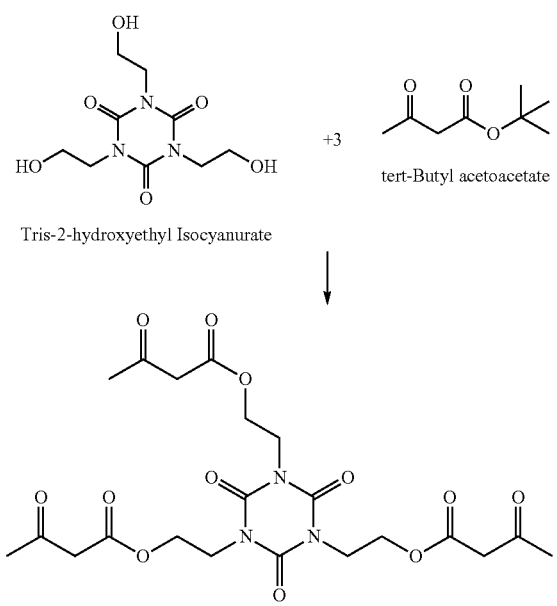

Example 3: Preparation of HBPA Di-Acetoacetate

A 1 liter, 4-neck round-bottom flask fitted with mechanical stirrer, pressure equalizing addition funnel (nitrogen inlet), thermocouple connected to a controller and heating mantle, was charged with 481 g (2.00 mol) 4,4'-isopropylidenedicyclohexanol (hydrogenated bisphenol-A (HBPA)) and 163 g (1.03 mol) tort-butyl acetoacetate. The mixture was heated to about 110° C. Additional test-butyl acetoacetate, 502 g (3.17 mol), was gradually added into flask through additional funnel over about 3 hours. After all tert-butyl acetoacetate was added, the temperature was increased gradually to 150° C. and keep at this temperature for 2 hours. A vacuum (26" Hg) was applied to remove unreacted liquid and a yellow liquid product of 865 g was obtained.

The reaction is illustrated in Scheme 3.

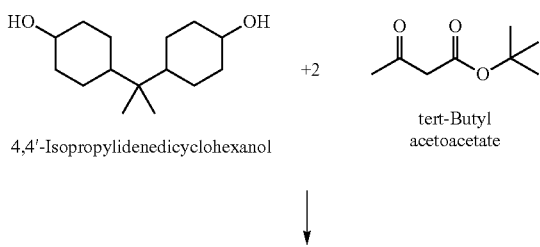

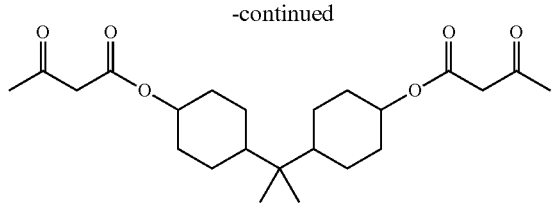

Example 4: Preparation of IPA-TMP Tetra-Acetoacetate

To a three-neck, round-bottom flask equipped with a mechanical stirrer, thermocouple connected to a controller and heating mantle, a Dean-Stark trap, a nitrogen inlet, and a water condenser, was charged 831 g (5.00 mol) isophthalic acid (IPA) and 1342 g (10.00 mol) trimethylolpropane (IMP). The mixture was allowed to react at 215° C. for 8 hours until the acid number was determined to be less than 3.0 mg KOH/g equivalent.

To 1038 g of the above resulting polyester polyol, 1684 g tert-butyl acetoacetate was gradually added over about 3 hours at 160-170° C. After all tert-butyl acetoacetate was added, the temperature was increased gradually to 180° C. and kept at this temperature for another 2 hours. A vacuum (26" Hg) was applied to remove unreacted liquid and a yellow liquid product of 1846 g was obtained.

The reaction is illustrated in scheme 4.

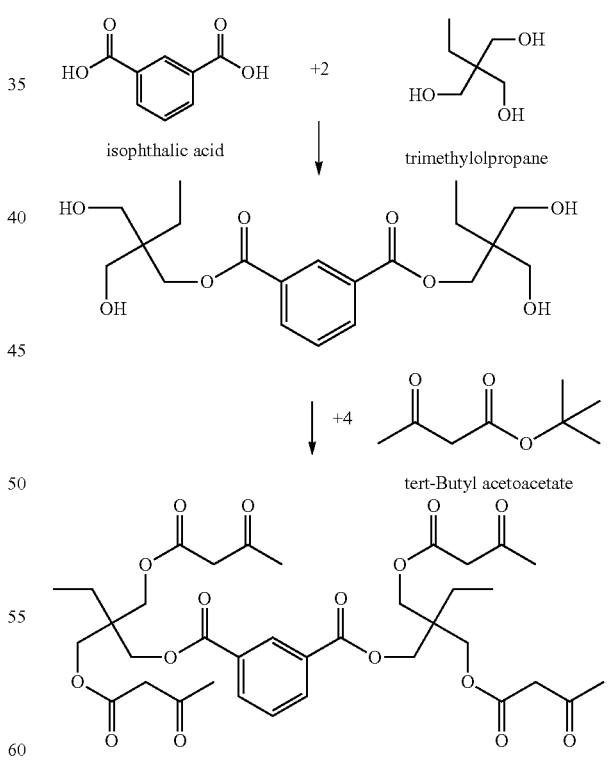

Example 5: Preparation of EA-GC Tris-Acetoacetate

To a three-neck, round-bottom flask equipped with a mechanical stirrer, thermocouple connected to a controller and heating mantle, a Dean-Stark trap, a nitrogen inlet, and a water condenser, was charged 184 g (3.00 mol) ethanolamine (EA). 358 g (3.00 mol) 4-hydroxymethyl-1,3-dioxolan-2-one (glycerine carbonate (OC)) was added into the flask over 0.5 hr at 20-40° C. The mixture was allowed to react at 40-75° C. for 6 hours.

To the resulting urethane tripolyol, 1424 g tert-butyl acetoacetate was added and the temperature was increased gradually to 140° C. and kept at this temperature for another 3 hours. A vacuum (26" Hg) was applied to remove unreacted liquid and a dark yellow liquid product of 1239 g was obtained.

The reaction is illustrated in Scheme 5.

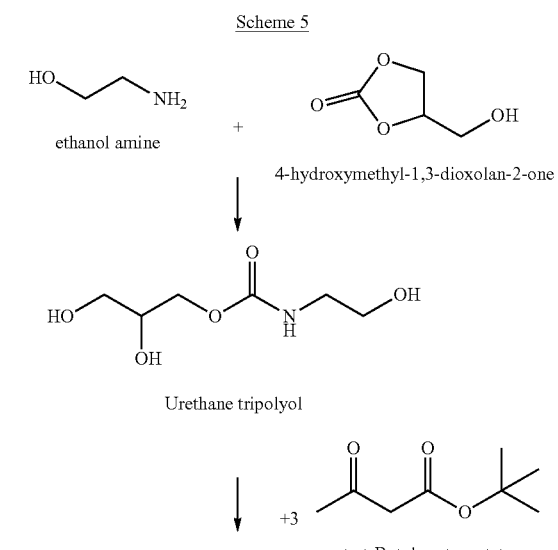

Example 6: Preparation of Acetoacetate-Functionalized Methacrylate Copolymer Resin To a three-neck, round-bottom flask equipped with a mechanical stirrer, thermocouple connected to a controller and heating mantle, a Dean-Stark trap, a nitrogen inlet, and a water condenser, was charged 500 g of xylene. A monomer solution of 638 g (2.87 mol) isobornyl methacrylate, 1052 g (4.91 mol) acetoacetoxyethyl methacrylate, 66 g dicumyl peroxide and 3 g 2-mercaptoethanol was added over 4 hr at 140° C. The mixture was allowed to react at 140° C. for another 2 hr. A vacuum (26" Hg) was applied to remove xylene and unreacted liquid. The obtained methacrylate copolymer is solid at room temperature.

The reaction is illustrated in Scheme 6 below.

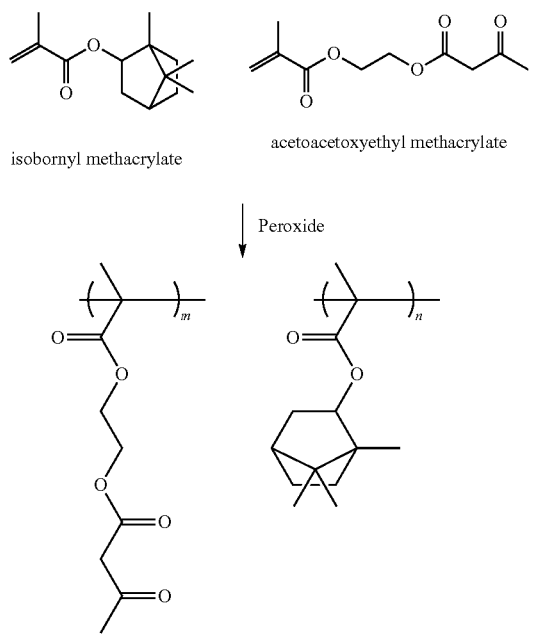

Example 7: Preparation of Gel Coat Composition

A gel coat composition was prepared by mixing, respectively, 252 g of the IPA-TMP Tetra-Acetoacetate from Example 4, 184 g of TMPTA, 120 g of titanium dioxide, 30 g of talc and 4 g of fumed silica under high shear. The gel coat composition had a Brookfield viscosity of 20,000 centipoise (cps) at 25° C. (77° C.) at 4 rpm.

Example 8: Preparation of Laminating Resin Composition

A laminating resin was prepared by mixing, respectively, 263 g of IPA-TMP Tetra (Acetoacetate) from Example 4 and 285 g of TMPTA. The laminating resin composition had a Brookfield viscosity of 900 centipoise (cps) at 25° C. (77° C.).

Example 9: Preparation of DBU Catalyst Solution

A catalyst solution of DBU was prepared by dissolving 20 g DBU in 7 g ethanol. The solution is a clear liquid.

Example 10: Preparation of DABCO Catalyst Solution

A catalyst solution of DABCO was prepared by dissolving 30 g DABCO in 20 g ethanol. The solution is a clear liquid.

Example 11: Gel Coat Laminate Panel Preparation 200 g of the gel coat composition from Example 7 was mixed with 2.7 g DBU catalyst solution from Example 9 by hand. The gel coat composition was sprayed on a waxed and buffed flat tempered glass plate to a thickness of 15-40 mils (1 mil=0.0111 inch). After 20 minutes at room temperature (25° C.), the gel coat film was tacky free.

200 g of the laminating resin from Example 8 was mixed with 2.48 g (1.24 wt-%) DBU catalyst solution from Example 9. A ⅛" laminate was formed by applying a 1.5 oz chop-strained mat and the laminating resin/DBU catalyst mixture onto the gel coat film. The laminate was allowed to cure for 16-20 hours at ambient temperature (25° C.), then removed from the mold and cut into test parts.

Example 12: Gel Coat Formulation

Gel coat formulations were prepared by mixing, respectively, TMPTris (Acetoacetate) (150 g) prepared from Example 1, the acetoacetate-functionalized methacrylate copolymer resin (68 g) prepared from Example 6, TMPTA (184 g), heptadecafluorodecyl acrylate (9 g, Zonyl TA-N from DuPont), titanium dioxide (120 g), talc (30 g) and fumed silica (4 g). The gel coat composition had a Brookfield viscosity of 16650 centipoise (cps) at 25° C. (77° C.) at 4 rpm.

Example 13: Gel Coat Laminate Panel Preparation

The gel coat composition (200 g) prepared from Example 7 was mixed with the catalyst solution of DBU (1.0 g) and ethanol (0.3 g), and sprayed on a waxed and buffed flat tempered glass plate to a thickness of 15-40 MILS (1 MIL-0.001 inch). After 20 min., the gel coat film was tacky free and a barrier coat (ARMORGUARD from CCP) was sprayed onto the film to a thickness of 23 MILS. A ⅛" laminate is made using chopped fiberglass and a polyester resin (STYPOL LSPA-2200, 40% mat/60% resin), Methyl ethyl ketone peroxide (MEKP) co-initiator at 1.2 wt % is used to cure the polyester resin. The laminate is allowed to cure for 16-20 hours at room temperature, then removed from the mold and cut into test parts.

Example 14: Gel Coat Laminate Panel Preparation

The gel coat composition (200 g) prepared from Example 7 was mixed with the catalyst solution of DABCO (1.0 g) and ethanol (1.0 g), and sprayed on a waxed and bulled flat tempered glass plate to a thickness of 15-40 MILS (1 MIL-0.001 inch). After 12 hr., the gel coat film was somewhat tacky and a barrier coat (ARMORGUARD from CCP) was sprayed onto the film to a thickness of 23 MILS. A ⅛" laminate is made using chopped fiberglass and a polyester resin (STYPOL LSPA-2200, 40% mat/60% resin). Methyl ethyl ketone peroxide (MEKP) co-initiator at 1.2 wt % is used to cure the polyester resin. The laminate is allowed to cure for 16-20 hours at room temperature and 5 hours at 100° C., then removed from the mold and cut into test parts.

Examples 15 to 21: Preparation of Clear Castings

Clear castings were prepared by mixing the resin, acrylate, and catalyst listed in Table 1 (below) by hand and pouring the resin mixture into a cavity between two glass plates with ⅛" spacing. The resin was cured at ambient temperature overnight and post-cured at 100° C. for 5 hours. The cured resins were tested for physical properties according to ASTM D638, D648, and D790. The results are listed in Table 1.

TABLE 1

Physical properties of clear casting of resin

| | Example | | | | |
|---|---|---|---|---|---|
| | 15 | 16 | 17 | 18 | 19 |
| Resin, weight (g) | Ex 1, 100 | Ex 1, 100 | Ex 1, 55 | Ex 2, 162 | Ex 4, 132 |
| Acrylate, weight (g) | TMPTA, 100 | SR355, 100 | SR368, 48 SR454, 76 TMPTA, 55 | TMPTA, 124 | TMPTA, 143 g |
| Catalyst, weight (g) | TMG, 0.7 | DBU, 0.7 | Ex 10, 3.6 | Ex 9, 2.3 | Ex 9, 2.3 |
| Viscosity (cp) | 95 | 310 | 1000 | 1000 | 900 |
| Mechanical Properties | | | | | |
| Tensile Strength (psi) | 7500 | 6680 | 10460 | 10760 | 6510 |
| Tensile Modulus (ksi) | 451 | 449 | 514 | 509 | 420 |
| Elongation (%) | 2.3 | 1.9 | 3.2 | 3.9 | 1.7 |
| Flex Strength (psi) | 13730 | 12610 | 17270 | 18130 | 16700 |
| Flex Modulus (ksi) | 432 | 438 | 488 | 510 | 477 |
| HDT (° C.) | 62 | 48 | 70 | 77 | 86 |

| | Example | |
|---|---|---|
| | 20 | 21 |
| Resin, weight (g) | Ex 5, 165 | Ex 1, 150 |
| | | Ex 6, 68 |
| Acrylate, weight (g) | TMPTA 113 | TMPTA 184 |
| Catalyst, weight (g) | Ex 9, 2.4 | Ex 9, 2.3 |
| Viscosity, (cps) | — | 340 |
| Mechanical Properties | | |
| Tensile Strength (psi) | 8720 | 8840 |
| Tensile Modulus (ksi) | 456 | 468 |
| Elongation (%) | 4.3 | 3.6 |
| Flex Strength (psi) | 8600 | 1510 |
| Flex Modulus (ksi) | 318 | 433 |
| HDT (° C.) | 34 | 69 |

What is claimed:

1. A gel coated article, comprising a cured thermoset gel coat on a surface of the article, wherein the article is a reinforced resin composite comprising a resin and a reinforcing material, and said resin and the thermoset gel coat being crosslinked, solid and styrene free with zero VOCs, wherein:
    the resin comprises crosslinked acetoacetylated polyhydroxy polyol and multifunctional acrylate monomer or oligomer, and
    the thermoset get coat comprises crosslinked acetoacetylated polyhydroxy polyol, multifunctional acrylate monomer or oligomer, and a copolymer made by free radical copolymerization of vinyl monomers, wherein at least one of the vinyl monomers contains an acetoacetate functional group.

2. The gel coated article of claim 1, wherein the acetoacetylated polyhydroxy polyol is formed by reacting a polyhydroxy polyol having at least two hydroxyl groups per molecule with a $C_1$-$C_5$ alkyl acetoacetate in a transesterification process to form a crosslinkable, multifunctional acetoacetylated polyhydroxy polyol having at least two acetoacetyl functional groups per oligomer.

3. The gel coated article of claim 1, wherein the polyhydroxy polyol has at least three hydroxyl groups per molecule.

4. The gel coated article of claim 1, wherein the acetoacetylated polyhydroxy polyol has:
    an acetoacetyl content of 5 to 80 weight %,
    a hydroxyl number of 0 to 60 mg KOH/g,
    an acid value of 0 to 5 mg KOH/g, and
    a number average molecular weight (Mn) of 250 to 6000 g mole$^{-1}$.

5. The gel coated article of claim 1, wherein the thermoset gel coat is formed from a crosslinkable, styrene free, thermosetting gel coat composition comprising the acetoacetylated polyhydroxy polyol, the one or more multifunctional acrylate monomers or oligomers, an additive component, and a base catalyst.

6. The gel coated article of claim 5, wherein the gel coat composition comprises:
    15 to 70 wt % of the acetoacetylated polyhydroxy polyol,
    15 to 70 wt % of the one or more multifunctional acrylate monomers or oligomers, and
    2 to 40 wt % of the additive component,
    based on the total weight of the gel coat composition.

7. The gel coated article of claim 5, wherein the additive component is selected from the group consisting of fillers, pigments, thixotropic agents, promoters, inhibitors, stabilizers, extenders, air release agents, leveling agents, and combinations thereof.

8. The gel coated article of claim 5, wherein the additive component is a thixotropic agent selected from the group consisting of silicas and clays.

9. The gel coated article of claim 5, wherein the additive component comprises a filler selected from the group consisting of clay, magnesium oxide, magnesium hydroxide, aluminum trihydrate (ATH), calcium carbonate, calcium silicate, mica, aluminum hydroxide, barium sulfate and talc, and mixtures thereof.

10. The gel coated article of claim 1, wherein the reinforced resin composite comprises a reinforcing material selected from the group consisting of glass fiber, polyethylene fiber, carbon fiber, metal fiber, and ceramic fiber.

11. The gel coated article of claim 1, wherein the article is selected from boat hulls, bath tub enclosures, pools, spas and body panels on cars and trucks.

12. The gel coated article of claim 1, wherein the gel coat has a heat deflection temperature (HDT) from 34 to 86, as tested by ASTM D648.

13. The gel coated article of claim 1, wherein the gel coat has a tensile strength from 7500 psi to 107600, and a tensile elongation from 1.9% to 4.3%.

14. The gel coated article of claim 1, wherein the gel coat has a flexural strength from 8600 psi to 18130 psi.

15. The method of claim 1, wherein the copolymer is made by free radical copolymerization of isobornyl methacrylate and acetoacetoxyethyl methacrylate.

16. The method of claim 1, wherein the crosslinked acetoacetylated polyhydroxy polyol and multifunctional acrylate monomer or oligomer of the article is different from that of the thermoset gel coat.

17. A method of making a gel coated article, comprising:
    providing a crosslinkable thermosetting gel coat composition having a viscosity at ambient temperature of 50 to 1200 cps under high shear and of 8,000 to 25,000 cps at low shear, wherein the composition comprises an acetoacetylated polyhydroxy polyol having at least two acetoacetyl functional groups, one or more multifunctional acrylate monomers or oligomers, a copolymer made by free radical copolymerization of vinyl monomers, wherein at least one of the vinyl monomers contains an acetoacetate functional group, at least one additive component, and a base catalyst; and
    applying the thermosetting gel coat composition as an in-mold coating to a surface of a mold;
    allowing the gel coat composition to cure at ambient temperature to form a partially crosslinked, tacky to tacky-free gel coat;
    applying a material to be molded onto the partially crosslinked gel coat;
    applying a crosslinkable laminating resin onto said material, the laminating resin comprising an acetoacetylated polyhydroxy polyol having at least two acetoacetyl functional groups per molecule, one or more multifunctional acrylate monomers or oligomers and a base catalyst; and
    allowing the laminating resin and the gel coat to cure at ambient temperature to a solid, crosslinked, thermoset resin being styrene free.

18. The method of claim 17, wherein the acetoacetylated polyhydroxy polyol has:
    an acetoacetyl content of 5 to 80 weight %,
    a hydroxyl number of 0 to 60 mg KOH/g,
    an acid value of 0 to 5 mg KOH/g, and
    a number average molecular weight (Mn) of 250 to 6000 g mole$^{-1}$.

19. The method of claim 17, wherein the gel coat is 70 to 100% crosslinked.

* * * * *

UNITED STATES PATENT AND TRADEMARK OFFICE
CERTIFICATE OF CORRECTION

| | |
|---|---|
| PATENT NO. | : 11,091,651 B2 |
| APPLICATION NO. | : 15/821168 |
| DATED | : August 17, 2021 |
| INVENTOR(S) | : Ming Yang Zhao et al. |

It is certified that error appears in the above-identified patent and that said Letters Patent is hereby corrected as shown below:

In the Specification

Column 4, Line 67, "10,000 l/s." should be changed to --10,000 1/s.--.
Column 5, Line 22, "(di-IMP)" should be changed to --(di-TMP)--.
Column 5, Line 33, "(FAA)" should be changed to --(EAA)--.
Column 5, Line 64, "polyol, examples" should be changed to --polyol. Non-limiting examples--.
Column 6, Line 16, "acetoacetate-functional zed" should be changed to
--acetoacetate-functionalized--.
Column 7, Line 52, "(ATE)" should be changed to --(ATH)--.
Column 8, Line 56, "(DARCO)" should be changed to --(DABCO)--.
Column 8, Line 56, "and N-butyl" should be changed to --and N'-butyl--.
Column 10, Line 19, "tort-butyl" should be changed to --tert-butyl--.
Column 11, Line 42, "tort-butyl" should be changed to --tert-butyl--.
Column 11, Line 43, "test-butyl" should be changed to --tert-butyl--.
Column 12, Line 19, "(IMP)" should be changed to --(TMP)--.
Column 13, Line 4, "(OC))" should be changed to --(GC))--.
Column 14, Line 66, "(1 mil=0.0111 inch)" should be changed to --(1 mil=0.001 inch)--.
Column 15, Line 31, "resin)," should be changed to --resin).--.
Column 16, Line 10, "bulled" should be changed to --buffed--.

Signed and Sealed this
Twenty-eighth Day of June, 2022

Katherine Kelly Vidal
*Director of the United States Patent and Trademark Office*